US012717164B2

(12) United States Patent
Nakai

(10) Patent No.: US 12,717,164 B2
(45) Date of Patent: Aug. 25, 2026

(54) GLASSES

(71) Applicant: LINE-INDUSTRY Co., Ltd., Komaki (JP)

(72) Inventor: Kenji Nakai, Komaki (JP)

(73) Assignee: LINE-INDUSTRY Co., Ltd., Komaki (JP)

( * ) Notice: Subject to any disclaimer, the term of this patent is extended or adjusted under 35 U.S.C. 154(b) by 266 days.

(21) Appl. No.: 18/570,467

(22) PCT Filed: Jun. 2, 2022

(86) PCT No.: PCT/JP2022/022498
§ 371 (c)(1),
(2) Date: Dec. 14, 2023

(87) PCT Pub. No.: WO2022/264828
PCT Pub. Date: Dec. 22, 2022

(65) Prior Publication Data

US 2024/0280831 A1 Aug. 22, 2024

(30) Foreign Application Priority Data

Jun. 16, 2021 (JP) ................................ 2021-100457

(51) Int. Cl.
*G02C 5/14* (2006.01)
*G02C 3/00* (2006.01)

(52) U.S. Cl.
CPC ............. *G02C 5/143* (2013.01); *G02C 3/003* (2013.01); *G02C 5/14* (2013.01); *G02C 2200/10* (2013.01)

(58) Field of Classification Search
CPC .......... G02C 3/003; G02C 5/143; G02C 5/14; G02C 2200/10
USPC .................................................. 351/111–123
See application file for complete search history.

(56) References Cited

U.S. PATENT DOCUMENTS

2006/0077339 A1* 4/2006 Jamie .................... G02C 3/003 351/119
2006/0098160 A1* 5/2006 Jamie .................... G02C 5/143 351/123
2017/0188947 A1* 7/2017 Connor ................. A61B 5/369

FOREIGN PATENT DOCUMENTS

JP H0723322 U 4/1995
JP 2007072015 A 3/2007
JP 2020076798 A * 5/2020
JP 2020-95243 A 6/2020
JP 2020095243 A * 6/2020 ............... G02C 5/16
WO 2006080773 A1 8/2006

* cited by examiner

*Primary Examiner* — Mahidere S Sahle
(74) *Attorney, Agent, or Firm* — Muncy, Geissler, Olds & Lowe, P.C.

(57) ABSTRACT

A frame 1 of the glasses G includes each of temple tips 4*a*, 4*b* bent in an upward protruding shape so as to contact a portion from a rear side to a front side of a base of a helix of the wearer. Each of the temple tips 4*a*, 4*b* and each of temple portions 3*a*, 3*b* have a connecting portion bent in a downward protruding shape so as to arrange each of the temple portions 3*a*, 3*b* along an upper edge of a zygomatic arch of the wearer. Each of the temple tips 4*a*, 4*b* has a proximal end provided with a pressing protrusion 13 for pressing an upper portion of a rear end of a zygomatic arch of the wearer.

3 Claims, 10 Drawing Sheets

（a）

（b）

(a)

(b)

GLASSES

TECHNICAL FIELD

The present invention relates to glasses that are used as a fashion item in addition to a purpose of correcting vision and a purpose of blocking sunlight.

BACKGROUND ART

Typical glasses have a front portion (so-called a bridge portion) for holding a pair of left and right lenses, temple portions extending from both the left and right ends of the front portion, and temple tips continuously provided behind the temple portions. Nose pads (or nose pads) are provided at the center of the front portion so as to be brought into contact with the base of the nose in order to prevent a situation in which the front portion falls off while the glasses are worn. However, when the glasses provided with the nose pads are worn for a long period of time, the load of the front portion continues to be applied to the base of the nose, which may cause discomfort to the wearer. In addition, when the glasses are detached, the mounting marks of the nose pads may be formed at the root of the nose, which is also problematic in terms of beauty.

In view of this, there has been developed glasses in which the nose pads are not provided in the front portion, temple pads for contacting temples of a wearer are provided at the insides of temple portions, and the load of the front portion is supported by the temple pads (Patent Document 1).

Patent Document 1: Japanese Unexamined Patent Application Publication No. 2020-95243

DISCLOSURE OF THE INVENTION

Problems to be Solved by the Invention

However, since the temples are portions where muscles move greatly when the wearer performs a movement of opening of the mouth, the glasses having the front portion whose load is supported by the temple pads in contact with the temples as disclosed in Patent Document 1 cannot be said to have a good wearing feeling. Further, every time the wearer repeats the movement of opening of the mouth, it is likely to fall off. Further, the glasses as disclosed in Patent Document 1, depending on degree of projecting of the temple pads to the inside and properties (for example, elasticity) of the temple pads, the wearer may feel pain or, on the contrary, the mounting strength may be insufficient, and the temple pads may fall off. In addition, for the glasses as disclosed in Patent Document 1, in order to stably support the load of the front portion by the temple pads, it is inevitable to enlarge the temple pads. When the temple pads are enlarged, it causes deterioration in appearance when worn.

An object of the present invention is to provide the glasses that solve the problems of the conventional glasses as disclosed in Patent Document 1. The glasses are excellent in mounting feeling and fit feeling, do not cause pain to a wearer, has high wearing strength (difficulty in slipping off) on the head, do not cause displacement of the front portion even when the wearer wears the glasses for a long period of time or when the wearer exercises, and is excellent in appearance and practical when the wearer wears the glasses.

Solutions to the Problems

Among the inventions, the invention according to claim 1 provides glasses. The glasses include a lens holder for holding a pair of left and right lenses, temple portions extending rearwardly from respective left and right ends of the lens holder, and temple tips provided on respective tip vicinities of the temple portions. Each of the temple tips is bent in an upward protruding shape so as to contact a portion from a rear side to a front side of a base of a helix of the wearer. Each of the temple tips and each of the temple portions has a connecting portion bent in a downward protruding shape so as to arrange each of the temple portions along an upper edge of a zygomatic arch of the wearer (that is, a shape in which a proximal end vicinity (a front end vicinity) of each of the temple tips is bent upward with respect to a straight portion of each of the temple portions). Each of the temple tips has a proximal end side (a front side of an upwardly protruding bent portion) provided with a pressing protrusion for pressing an upper portion (that is, a front of an upper side of a tragus) of a rear end vicinity of a zygomatic arch of the wearer.

Although a bending shape (a downward protruding bending shape) at the connecting portion between each temple tip and each temple portion varies depending on shape and size of the head of the wearer, it is preferred to adjust the difference in height between the bending point (the center portion of the bending) and the uppermost position of each temple tip (that is, the vertical difference between the inflection points) to be equal to or greater than 15 mm and equal to or less than 40 mm. The bending of the connecting portion between each temple tip and each temple portion allows each temple portion to be positioned more precisely along the upper edge of the zygomatic arch of the wearer. It is further preferred to adjust the height difference between the bending point at the connecting portion between each temple tip and each temple portion and the uppermost position of each temple tip so as to be equal to or greater than 20 mm and equal to or less than 30 mm.

In the invention according to claim 2, which is in the invention according to claim 1, the pressing protrusion is a substantially semi-cylindrical body protruding inward along a longitudinal direction of each of the temple tips.

The invention according to claim 3, which is in the invention according to claim 1 or 2, further includes a contact portion formed on an inside of each of the temple portions to be brought into contact with an outer side of a front end vicinity of a zygomatic arch of the wearer.

Effects of the Invention

According to the glasses according to claim 1, each temple tip has the upward protruding shape so as to contact the portion from the rear side to the front side of the base of the helix of the wearer, and the pressing protrusion for pressing the upper portion of the rear end vicinity of the zygomatic arch of the wearer is provided on the proximal end side of each temple tip. Thus, although the nose pads are not provided, the fitting property is very high. Even when the wearer repeats opening mouth movements, the wearer feels good fit and it is difficult to fall off. Further, even when the wearer wears the glasses for a long period of time or when the wearer exercises, the wearer does not feel pain nor cause displacement of the front portion.

Further, the glasses according to claim 1, the connecting portion between each temple tip and each temple portion is bent in the downward protruding shape, since each temple portion is arranged along the upper edge of the zygomatic arch of the wearer when the glasses are worn. Thus, the projection body provided on the inner surface of each temple portion (that is, projecting inward in the horizontal plane including the left and right temple portions) so as to project inward horizontally. The tips thereof configured to press against the upper edge of the zygomatic arch of the wearer allows easily improving the fitting property thereof. Moreover, the projection body provided on the inner surface of each temple portion so as to project inward and configured to press against the upper edge of the zygomatic arch of the wearer allows the projection body to become difficult to deform. Thus, the glasses can maintain the high fitting property without maintenance over a long period of time.

The glasses according to claim 2 includes the pressing protrusion having the substantially semi-cylindrical body protruding inward along the longitudinal direction of each temple tip, and the upper portion of the rear end vicinity of the zygomatic arch of the wearer is pressed with a large area. Thus, the proximal end vicinity (front end vicinity) of each temple tip locked around the base of the helix of the wearer is positioned with a high restraining force, thus ensuring the extremely high fitting property and making the glasses hard to fall off. In spite of this, the pressing protrusion is difficult to see from the outside, and therefore has excellent designability.

The glasses according to claim 3 includes the contact portion to be brought into contact with the outer side of the front end vicinity of the zygomatic arch of the wearer when the wearer wears the glasses. Thus, the glasses are excellent in a function of holding the left and right lenses. The glasses can be held so as not displace the left and right lenses at the correct eye point (usually, positions where the inner surfaces of the lenses are at a distance of 12 mm from the eyeball surfaces).

DESCRIPTION OF PREFERRED EMBODIMENTS

Hereinafter, an embodiment of glasses according to the present invention will be described in detail with reference to the drawings.

<Structure of Glasses>

FIG. 1 to FIG. 4 illustrate a front side, a rear side, a plan side, and a right side of the glasses, respectively. The glasses G are constituted of a pair of left and right lenses L1, L2 and a frame 1 for holding them. The frame 1 includes a lens holder 2 for holding the lenses L1, L2, temple portions 3*a*, 3*b* extending rearward from both left and right ends of the lens holder 2, and temple tips 4*a*, 4*b* continuously provided at respective rear end vicinities of the temple portion 3*a*, 3*b*.

The lens holder 2 functions as a so-called bridge, and is made of a metal (titanium). Then, the lens holder 2 is constituted of a connecting arm 5, retention frames 6*a*, 6*b* as rims for holding the left and right lenses L1, L2, endpieces 7*a*, 7*b* for connecting to the left and right temple portions 3*a*, 3*b*, hinges 8, 8 for holding the left and right temple portions 3*a*, 3*b* in a foldable manner, and the like.

The connecting arm 5 is formed in a curved rod shape having a central portion bulged forward. Further, the retention frames 6*a*, 6*b* are formed in a substantially rectangular shape along the outer peripheral edges (upper/lower and left/right edges) of the respective lenses L1, L2, and are fixed to the left and right of the connecting arm 5. The lenses L1, L2 are held by the retention frames 6*a*, 6*b*. Further, the endpieces 7*a*, 7*b* bent in a substantially dogleg shape are continuously provided on the outer sides of the respective retention frames 6*a*, 6*b*, and the respective ends thereof are in a condition of projecting rearward. The hinges 8, 8 are fixed to the insides of the endpieces 7*a*, 7*b*.

On the other hand, each of the left and right temple portions 3*a*, 3*b* is formed in a substantially straight line by a metal (titanium), and a length adjustment mechanism is provided for adjusting the front and rear length. That is, in the right temple portion 3*b*, a belt-like connecting member 33*b* slightly wider than a front member 31*b* is fixed to a rear end of the belt-like front member 31*b* that is wide in the up-down direction, and a substantially rod-like rear member 32*b* that is narrower in the up-down direction is connected by the connecting member 33*b* so as to be slidable back and forth.

Figure 5:
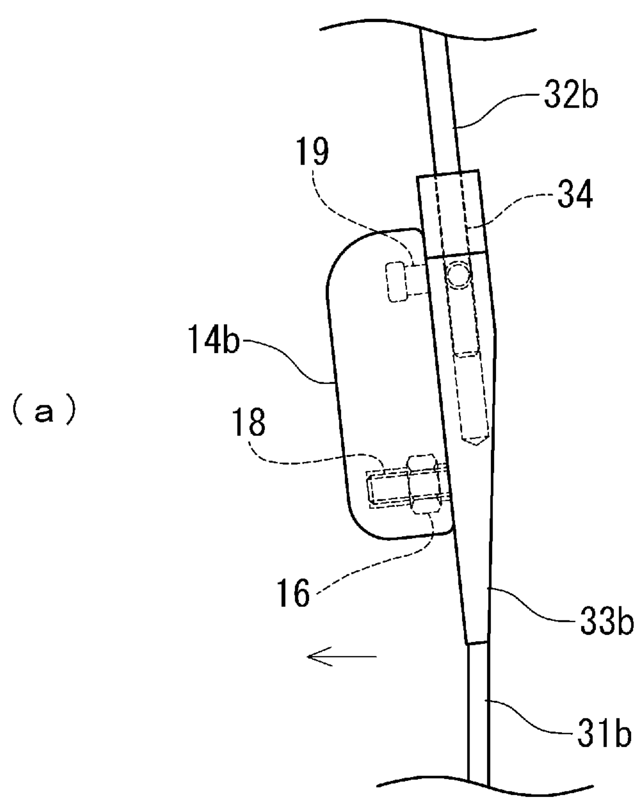
FIG. 5 is an explanatory view illustrating an installation portion of a connecting member of temple portions (FIG. 5A is a plan view, and FIG. 5B is a right side view).
Figure 5:
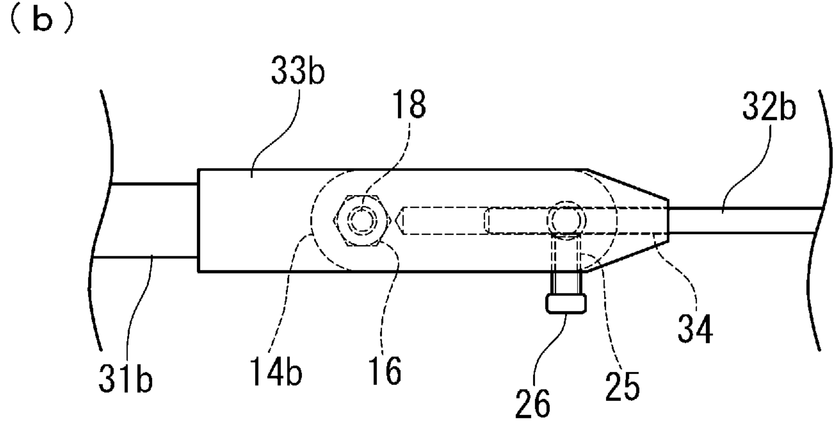

FIG. 5 illustrates an installation portion of the left connecting member 33*b*, and the connecting member 33*b* has an insertion hole 34 drilled along the longitudinal direction at the rear end vicinity thereof. A screw hole 35 is drilled in the lower surface so as to reach the insertion hole 34, and a pressing bolt 36 is screwed into the screw hole 35. Then, in the right temple portion 3*b*, while a portion in a proximity of the front edge of the rear member 32*b* is inserted into the insertion hole 34 of the connecting member 33*b* by an arbitrary length, holding the portion in the proximity of the front edge of the rear member 32*b* by screwing the pressing bolt 36 from the lower surface of the connecting member 33*b* allows fixing the portion in the proximity of the front edge of the rear member 32*b* to the connecting member 33*b*.

In the left temple portion 3*a*, a length adjustment mechanisms similar to the right temple portion 3*b* is provided symmetrically.

Hinge pieces 9, 9 for rotatably coupling with the hinges 8 and 8 provided on the left and right endpieces 7*a*, 7*b* of the lens holder 2 are fixed to the insides of the front end of the front members 32*b* of the respective temple portions 3*a*, 3*b*. In addition, portions of the rear end vicinities of the rear members 32*a*, 32*b* of the respective temple portions 3*a*, 3*b* are each bent upward to form cores 11 of the temple tips 4*a*, 4*b*.

Figure 4:
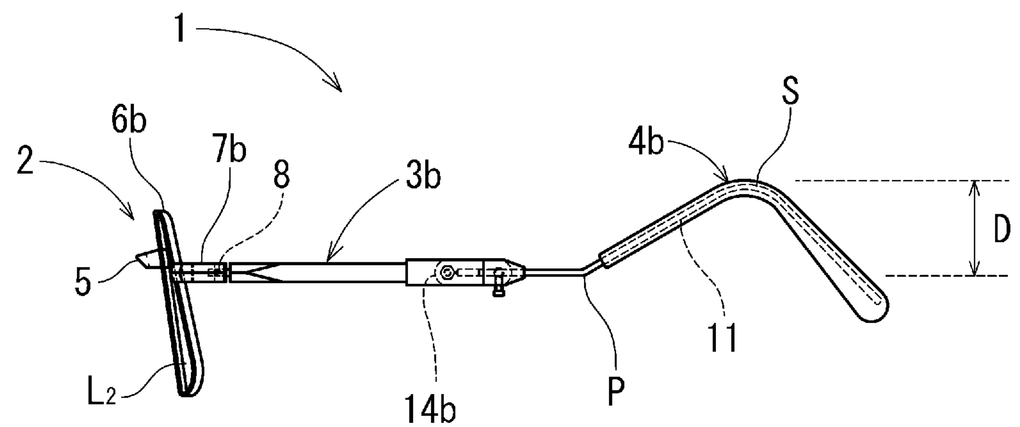
FIG. 4 is an explanatory diagram (right side view) illustrating the glasses.

On the other hand, the left and right temple tips 4*a*, 4*b* are formed by coating a synthetic resin (polyamide-based resin) on the outer sides of the cores 11 integrally extended from the rear ends of the left and right temple portions 3*a*, 3*b*, and are bent in an arc shape protruding upward in side view (see FIG. 4). In addition, the proximal end vicinities of the left and right temple tips 4*a*, 4*b* (that is, the connecting portions with the temple portions 3*a*, 3*b*) are bent in a downward protruding shape so as to form an angle of about 150° (bending point P). On the left and right sides of the glasses G, a height difference D between each bending point P, at the connecting portion between the temple tip 4*a*(4*b*) and the temple portion 3*a*(3*b*), and the uppermost position S of the temple tip 4*a*(4*b*) is approximately 25 mm.

Figure 6:
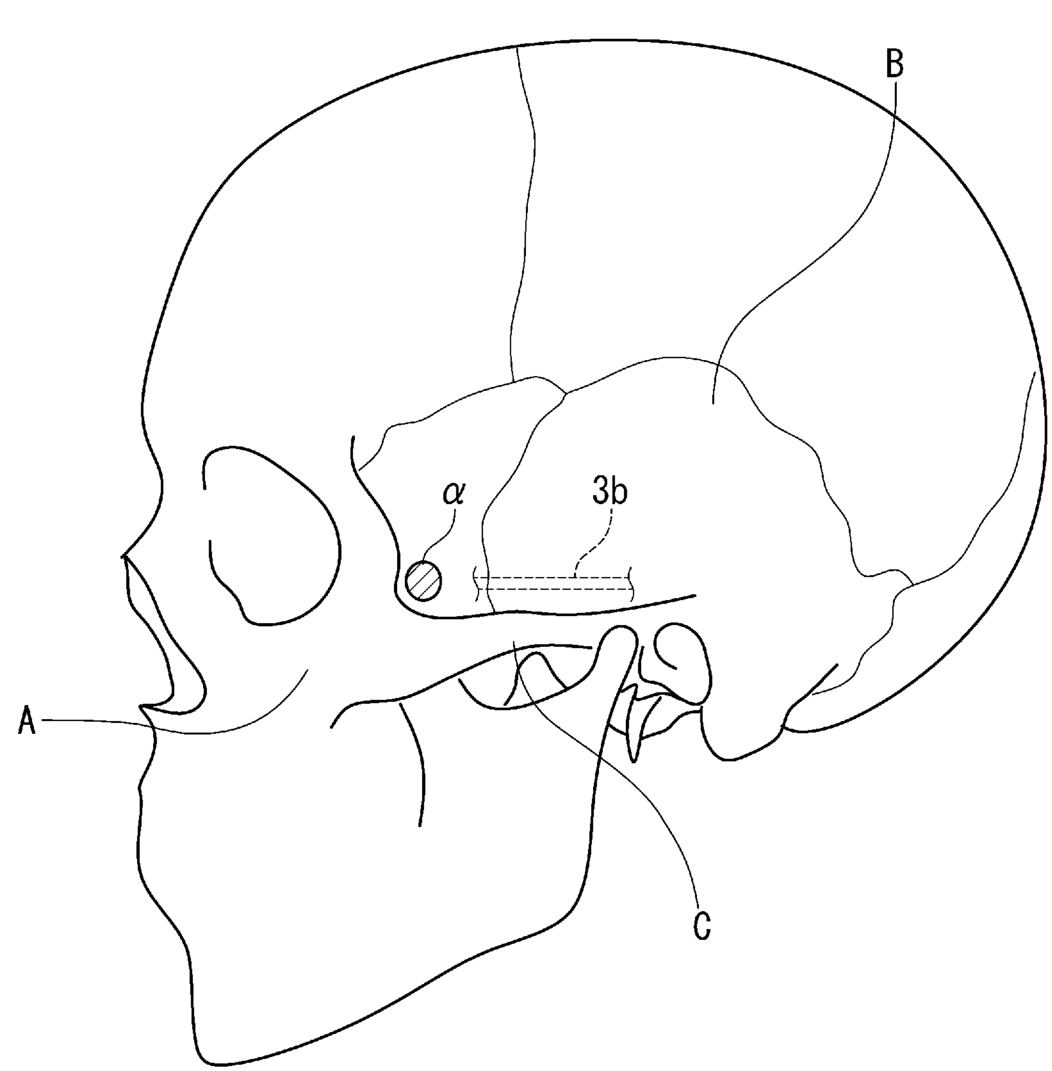
FIG. 6 is an explanatory view (side view) illustrating an outline of a bone structure of a head.

FIG. 6 schematically illustrates a human skull structure. The zygomatic arch C is an arcuate bone (bone portion) extending in a lateral direction and constituted of a temporal process of a zygomatic bone A and a zygomatic process of a temporal bone B, and is located at the lower end vicinity of the temporal bone B. The left and right temple portions 3*a*, 3*b* of the glasses G are intended to be arranged along the upper edge of the zygomatic arch C as indicated by the broken line in FIG. 6.

Further, as described above, the left and right temple tips 4*a*, 4*b* are greatly bent in an upward protruding shape. When the glasses are worn, the left and right temple tips 4*a*, 4*b* are fitted to the portions around the bases of the helixes of the wearer (that is, a substantially arcuate portion extending from a portion on the rear side of the base of the helix (a portion slightly recessed) to a portion on the front side of the base of the helix (an upper portion of the rear end vicinity of the zygomatic arch C) through the top of the base of the helix).

Figure 7:
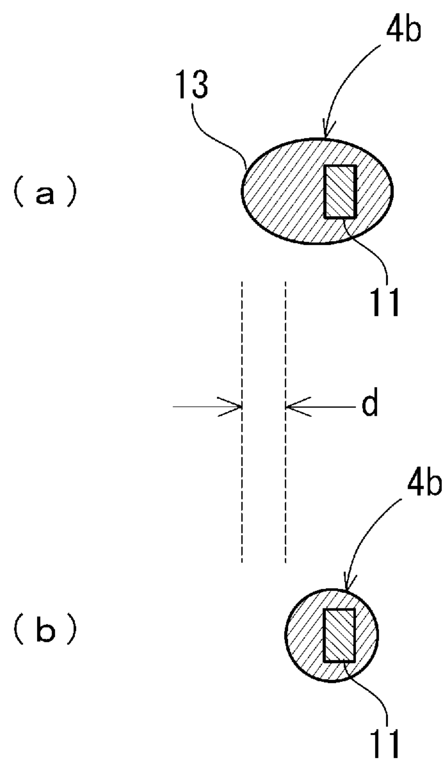
FIG. 7 is an explanatory view (vertical cross-sectional view) illustrating a pressing protrusion (FIG. 7A is the A-A line end view in FIG. 1, and FIG. 7B is the B-B line end view in FIG. 1).

A semi-cylindrical pressing protrusion 13 for pressing the upper portion of the rear end vicinity of the zygomatic arch of the wearer is formed on a portion inclined in the downward direction at the proximal end vicinity in each of the left and right temple tips 4*a*, 4*b*. FIG. 7A illustrates a vertical cross section (vertical cross section perpendicular to the longitudinal direction) of the installation portion of the pressing protrusion 13 of the right temple tip 4*b*, and FIG. 7B illustrates a vertical cross section of a portion other than the installation portion of the pressing protrusion 13 of the temple tip 4*b*. The portions of the proximal end vicinities of the left and right temple tips 4*a*, 4*b* are formed so as to bulge inward (toward the temporal bones B of the wearer) by a predetermined length (d in FIG. 7) relative to the respective cores 11 at the distal ends of the temple portions 3*a*, 3*b*, and the bulged portions function as the pressing protrusions 13. In addition, the left and right temple tips 4*a*, 4*b* are slightly curved inward in plan view from the front ends (proximal ends) to the rear ends so as to conform to the shape of the back of the wearer's head.

Figure 1:
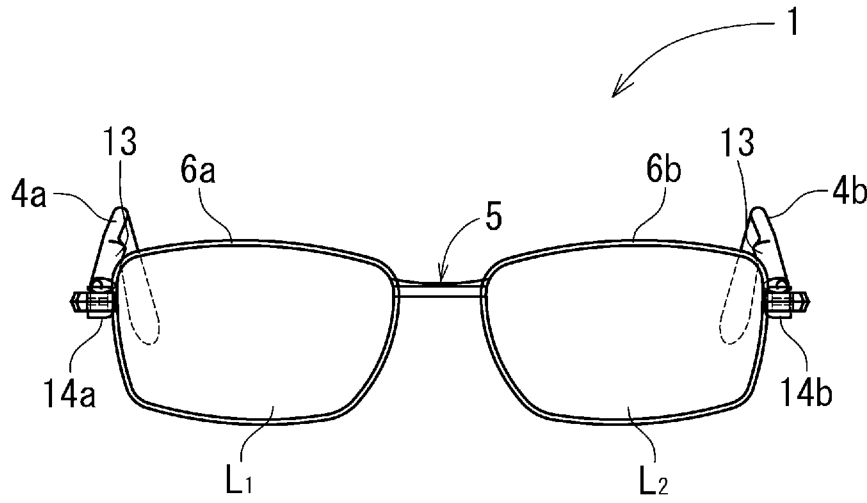
FIG. 1 is an explanatory diagram (front view) illustrating glasses.
Figure 2:
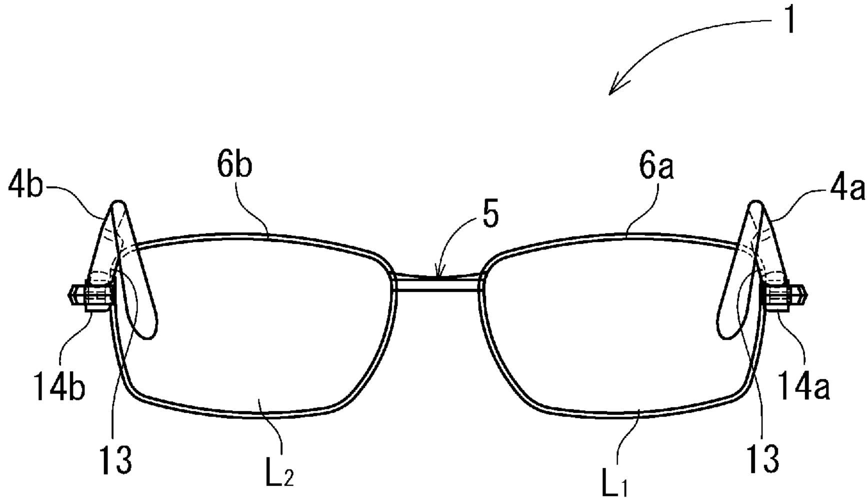
FIG. 2 is an explanatory diagram (rear view) illustrating the glasses.
Figure 3:
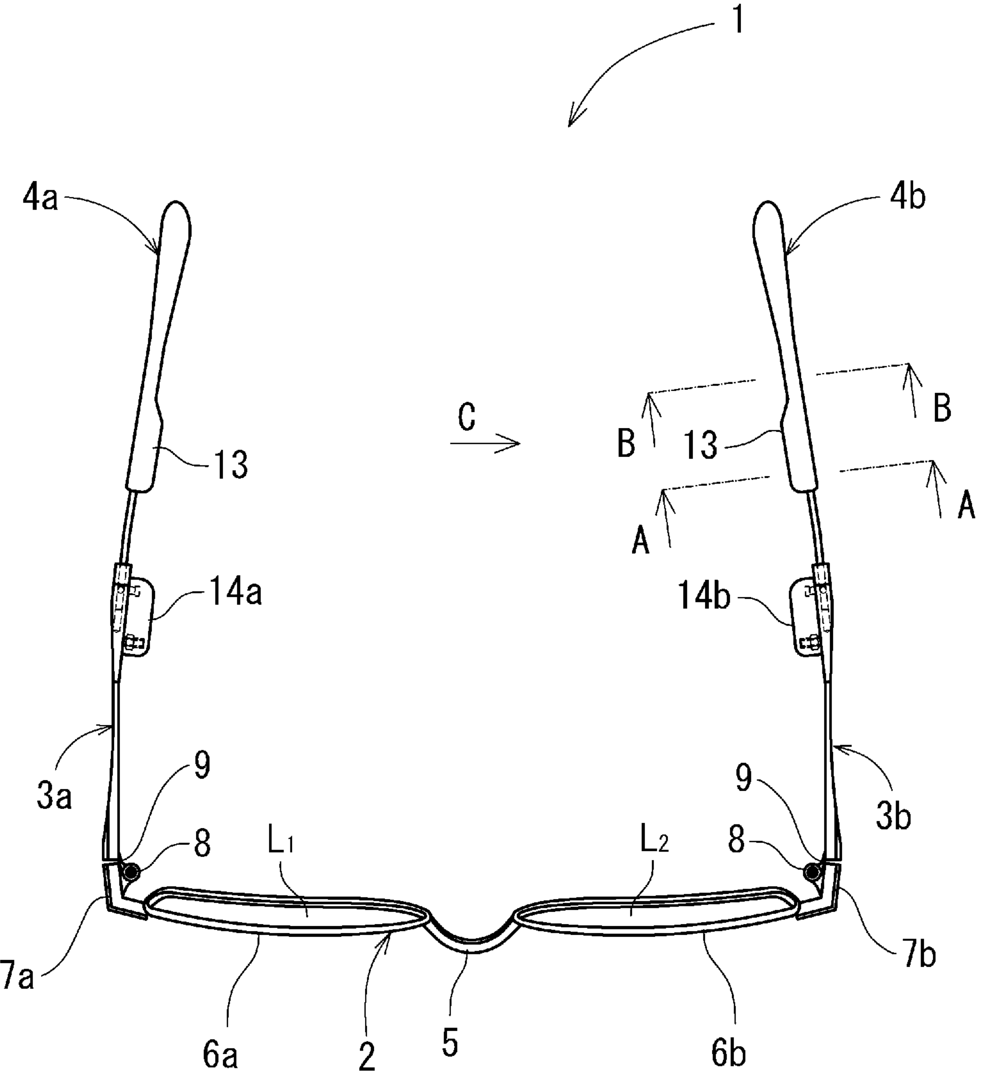
FIG. 3 is an explanatory diagram (plan view) illustrating the glasses.

Further, as illustrated in FIG. 3, contact portions 14*a*, 14*b* for contact with the outer sides of the front end vicinities (a portions in FIG. 6) of the zygomatic arches C of the wearer are fixed to the insides of the connecting members 33*a*, 33*b* of the left and right temple portions 3*a*, 3*b*, respectively. These contact portions 14*a*, 14*b* provide a function of placing the surfaces of the lenses L1, L2 at the appropriate eye points (usually, the positions where the inner surfaces of the lenses are at a distance of 12 mm from the eyeball surfaces) with respect to the positions of the eyes when worn, and a function of supporting the loads of the lenses L1, L2 at positions as close to the eyes as possible.

Figure 8:
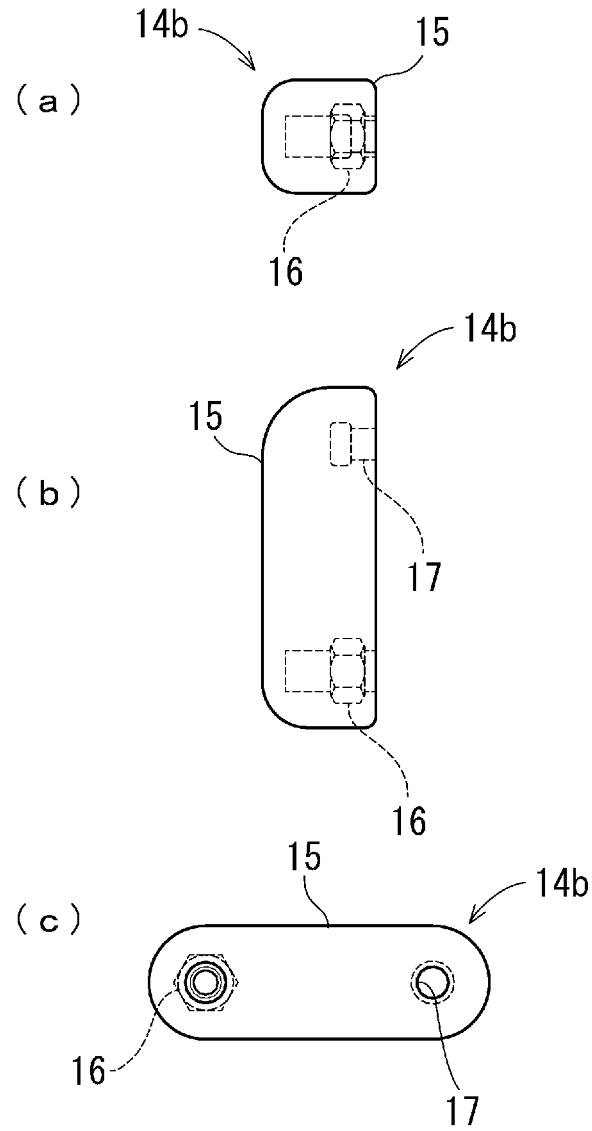
FIG. 8 is an explanatory view illustrating a contact portion (FIG. 8A is a front view, FIG. 8B is a plan view, and FIG. 8*c* is a right side view).

FIG. 8 illustrates the right contact portion 14*b*, and the contact portion 14*b* is formed integrally with a rectangular parallelepiped shape that is long in the front and rear direction (front and rear length×left and right width×height=15.0 mm×5.0 mm×5.0 mm) with rounded chamfered corners by a translucent and flexible (elastic) silicone-based rubber. Further, in front of a main body portion 15 of the contact portion 14*b*, a metallic nut 16, on which a screw groove is threaded, is fixed such that the axial direction thereof is orthogonal to the inner surface of the main body portion 15, and in rear of the main body portion 15, a cylindrical engaging hole 17 having a large diameter at the distal end is drilled so as to be orthogonal to the inner surface of the main body portion 15. On the other hand, as illustrated in FIG. 5, on a front side of the inner surface of the right connecting member 33*b*, a bolt 18 is installed so as to project inward, and on a rear side of the inner surface of the connecting member 33*b*, a cylindrical engaging body 19 having a large diameter at the distal end is provided so as to project inward.

The contact portion 14*b* is fixed to the inner surface of the connecting member 33*b* by screwing the bolt 18 of the connecting member 33*b* into the nut 16 on the front side and inserting and engaging (detachably engaging) the engaging body 19 of the connecting member 33*b* of the temple portion 3*b* into the engaging hole 17 on the rear side by using elasticity. Therefore, by adjusting the screwing degree between the nut 16 and the bolt 18, it is possible to adjust the amount of projection inward (the amount of protrusion in the arrow direction in FIG. 5A). The left contact portion 14*a* is also fixed symmetrically to the left temple portion 3*a* by a structure similar to the right contact portion 14*b* described above, thus allowing the adjustment of the amount of protrusion to the inside.

<How to Use and Function of Glasses>

Figure 9:
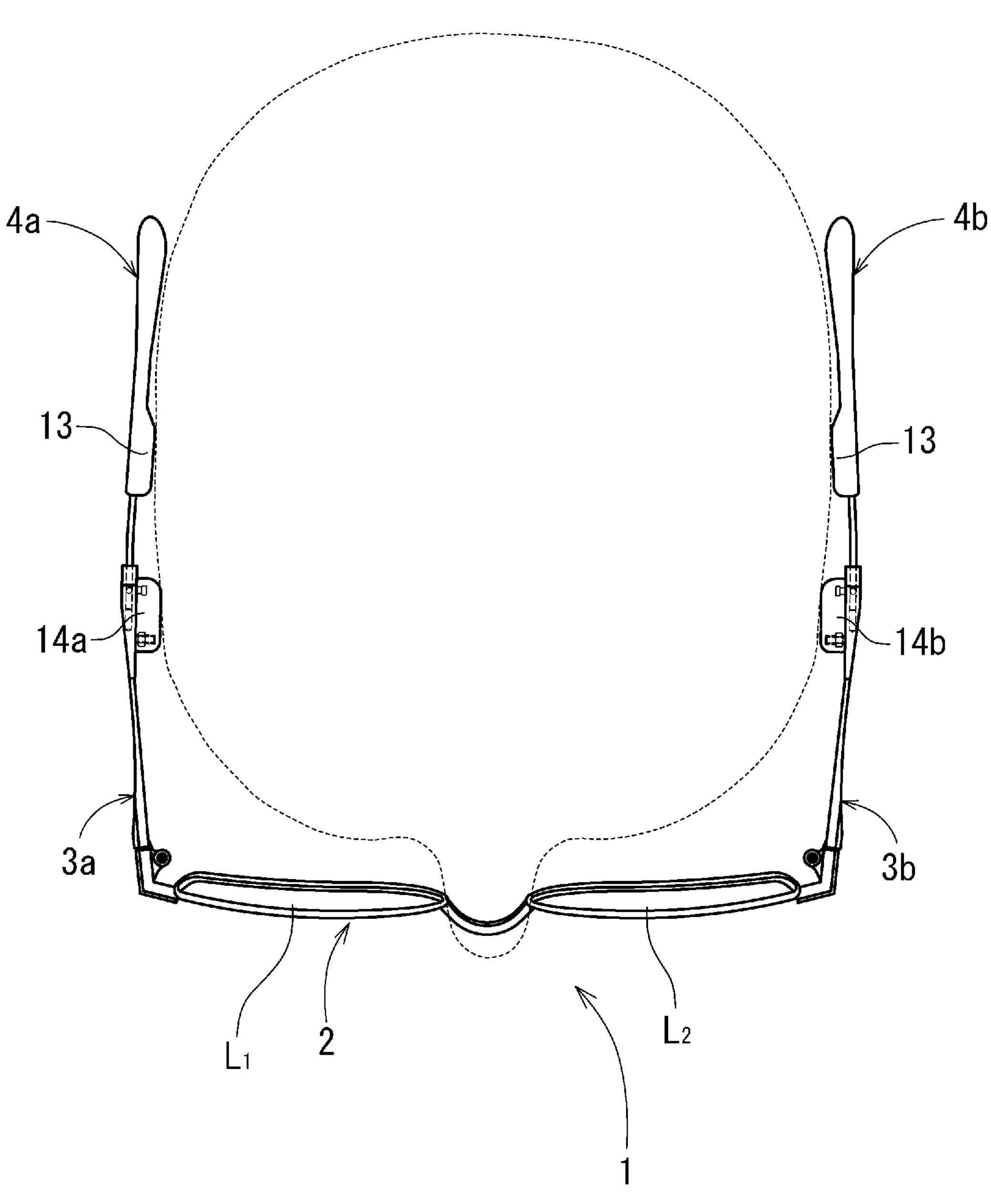
FIG. 9 is an explanatory view (plan view) illustrating a wearer wearing the glasses.
Figure 10:
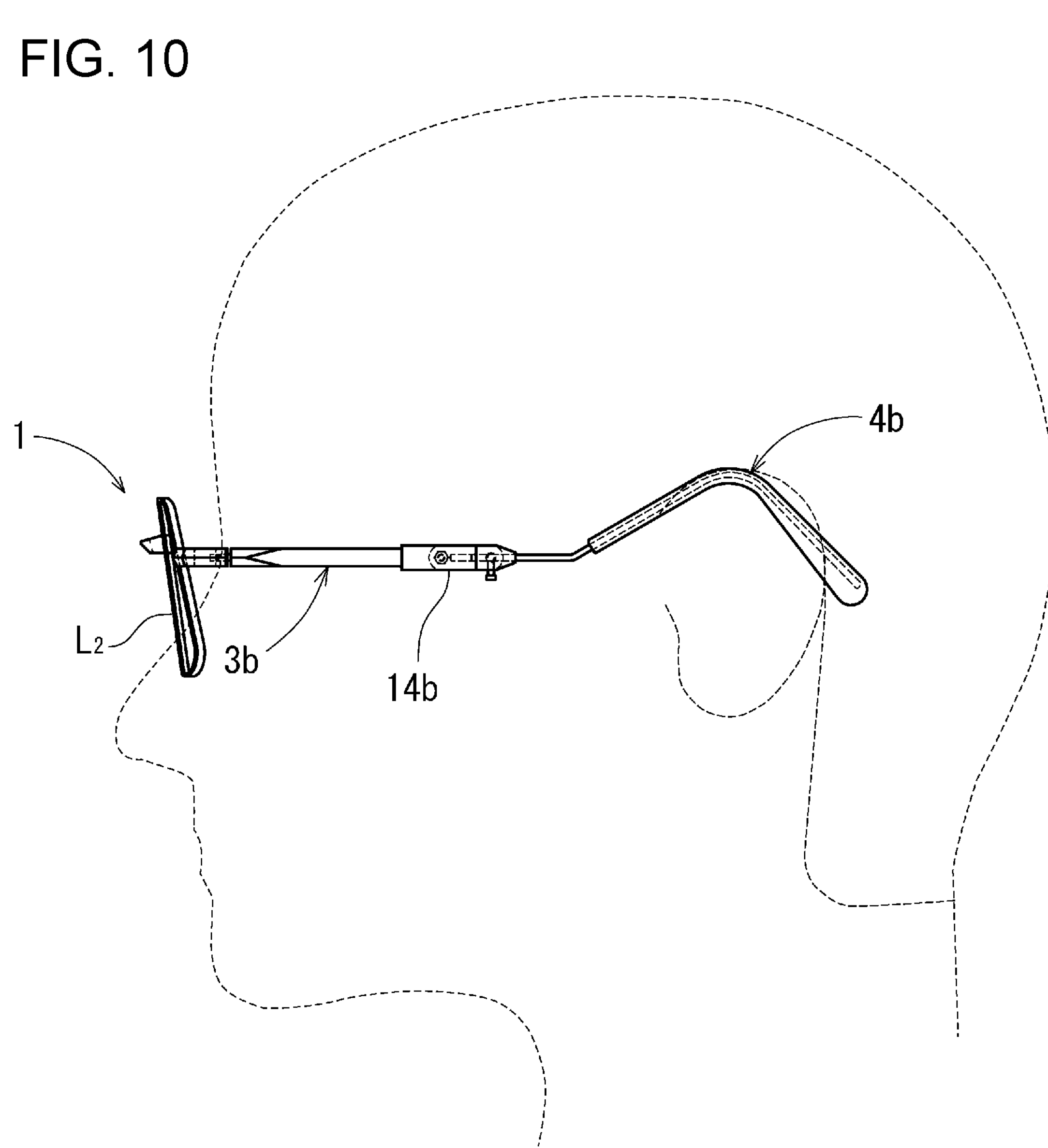
FIG. 10 is an explanatory view (right side view) illustrating the wearer wearing the glasses.

FIG. 9 and FIG. 10 illustrate the glasses G worn by the user. The glasses G are worn with the arcuately shaped left and right temple tips 4*a*, 4*b* extending from the rear sides of the ears of the wearer to portions of fronts of the upper sides of the tragi (that is, in contact with a portion from the rear side to the front side of the helix root of the wearer). When the glasses are worn with the left and right temple tips 4*a*, 4*b* arranged along substantially the upper halves of the ears of the wearer, the rear ends of the left and right temple tips 4*a*, 4*b* are fitted into the recesses of bones behind the ears, and the pressing protrusions 13, 13 of the front ends (proximal ends) of the left and right temple tips 4*a*, 4*b* are fixed (positioned) while pressing against the upper portions of the rear end vicinities of the zygomatic arches C of the wearer (that is, the front of the upper side of the tragus). Therefore, the left and right temple tips 4*a*, 4*b* are restrained from moving around the ears of the wearer.

When the glasses G are worn as described above, the left and right temple portions 3*a*, 3*b* are substantially horizontally arranged (see FIG. 6) along the upper edges of the zygomatic arches C of the wearer, and the left and right temple portions 3*a*, 3*b* are restrained such that the distal end sides thereof (rear end sides, that is, the right side in FIG. 4 and FIG. 10) do not move at the temporal regions of the wearer.

In addition, the contact portions 14*a*, 14*b* disposed to project inward at substantially the centers of the left and right temple portions 3*a*, 3*b* (substantially the center in the front-rear direction) are brought into contact with the outer sides of the front end vicinities of the zygomatic arches C of the wearer. Therefore, the proximal end sides (front end sides, that is, the left side in FIGS. 4 and 10) of the left and right temple portions 3*a*, 3*b* are restrained so as not to move in the temporal regions of the wearer, and the lens holder 2 is restrained so as not to move. In addition, since the glasses G are not provided with any pad for contact with the lens holder 2 against the nose, the lower ends of the left and right lenses are held without contacting the skin of the wearer.

As described above, since the glasses G are worn in contact with the skin of the head of the wearer in the entire left and right temple tips 4*a*, 4*b* and the portions of the contact portions 14*a*, 14*b*, it is possible to develop a higher wearing strength (fixing strength at the time of wearing).

<Effects of Glasses>

As described above, in the glasses G, each of the temple tips 4*a*, 4*b* is bent in an upward protruding shape (upward protruding circular arc shape) so as to be contact with portions from the rear sides to the front sides of the bases of the helixes of the wearer, and the pressing protrusion 13 for pressing the upper portion of the rear end vicinity of the zygomatic arch C of the wearer is provided on the proximal end side of each of the temple tips 4*a*, 4*b*. Therefore, the glasses G have the very high fitting property despite the absence of the nose pad. Even when the wearer repeats the opening mouth movement, the mounting feeling is good while the glasses G are hard to slip off. Further, even when the wearer wears for a long period of time or when the wearer exercises, the wearer does not feel pain nor cause displacement of the front portion.

In addition, the glasses G include the connecting portions between the temple tips 4*a*, 4*b* and the respective temple portions 3*a*, 3*b* bent in a downward protruding shape. The temple portions 3*a*, 3*b* are arranged along the upper edges of the zygomatic arches C of the wearer, and the contact portions 14*a*, 14*b* are formed on the insides of the respective temple portions 3*a*, 3*b* when worn. The contact portions 14*a*, 14*b* thereof are brought into contact with the outer sides of the front end vicinities of the zygomatic arches C of the wearer (a portion in FIG. 6) when worn. Thus, the glasses G have an excellent function of holding the positions of the left and right lenses L1, L2 and can hold the left and right lenses L1, L2 so as not to be displaced at the correct eye points (usually, the positions where the inner surfaces of the lenses are at a distance of 12 mm from the eyeball surfaces). Moreover, the fitting property can be maintained without the maintenance over a long period of time.

Furthermore, the glasses G include the pressing protrusions 13, 13 having the substantially semi-cylindrical body protruding inward along the longitudinal direction of the temple tips 4*a*, 4*b* and presses the upper portions of the rear end vicinities of the zygomatic arches of the wearer with large areas. Thus, the proximal end vicinities (front end vicinities) of the respective temple tips 4*a*, 4*b* locked around the bases of the helixes of the wearer are positioned with a high restraining force. Therefore, the glasses G have the high fitting property and very hard to slip off. In spite of this, the pressing protrusions 13, 13 are difficult to be seen from the outside, and thus are excellent in design.

In addition, in the glasses G, the respective temple tips 4*a*, 4*b* are formed in an arc shape protruding upward, and the left and right temple portions 3*a*, 3*b* are arranged so as to connect the proximal edge portions of the left and right temple tips 4*a*, 4*b* and the upper side of the outer center of the retention frames 6*a*, 6*b* holding the left and right lenses L1, L2. The contact portions 14*a*, 14*b* are installed so as not to be conspicuous from the outside at the same height position as the temple portions 3*a*, 3*b*. Thus, the external appearance is very good.

Further, since the glasses G are provided with the left and right contact portions 14*a*, 14*b* so as to be able to adjust the amount of protrusions to the inside, the pressing strength (that is, the fitting property) of the contact portions 14*a*, 14*b* against the temporal portions can be easily adjusted (by the wearer himself/herself). In addition, since the lengths of the left and right temple portions 3*a*, 3*b* of the glasses G are adjustable in the front-rear direction, the contact positions of the contact portions 14*a*, 14*b* can be easily adjusted according to the shape of the head (by the wearer oneself).

<Modified Example of Glasses>

The glasses according to the present invention are not limited to the aspects of the above-described embodiments, and the shapes, the structures, the materials, and the like of the lenses, the lens holder (the connecting arms, the holding frames), the temple portion, the contact portion, the temple tip, and the pressing protrusion can be appropriately changed as needed without departing from the spirit of the present invention.

For example, the glasses according to the present invention are not limited to the ones in which the lens holder and the temple portions are formed of a metal, and may be one in which the lens holder is formed of a metal and the temple portions are formed of a synthetic resin. The lens holder and the temple portions may be formed of a synthetic resin. Further, the glasses according to the present invention are not limited to the ones in which the temple tips continuously formed behind the temple portions as in the above embodiment (the temple tips are formed by coating a synthetic resin on the outer sides of the cores integrally formed on the rear ends of the metallic left and right temple portions), and may be provided with the temple tips and the temple portions separately.

In addition, the glasses according to the present invention are not limited to the ones in which the contact portions are made of a silicone rubber as in the above embodiment, and the material of the contact portion can be appropriately changed as needed. Further, as in the above embodiment, the contact portion is not limited to have a shape formed in a rectangular parallelepiped shape that is long in the front and rear direction, and may have a conical shape (a shape in which a tip is rounded and chamfered), a truncated cone shape, a shape formed in an elliptical columnar shape, or a triangular columnar shape (a shape in which a height direction is arranged perpendicularly to a longitudinal direction of a temple portion), a shape of a tapered tongue protruding inward, or the like. In addition, as in the above embodiment, when the contact portion is formed in a rectangular parallelepiped shape that is long in the front and rear direction, there is an advantage that it is easy to fix the contact portions firmly (so as not to inadvertently move) by bringing them into contact with the outer sides of the front end vicinities of the zygomatic arches of the wearer in a region that is long in the front and rear direction.

Further, the glasses according to the present invention are not limited to the ones in which the contact portion having the contact surface in contact with the temporal region of the wearer (outer side of the front end vicinity of the zygomatic arch) is substantially parallel to the inner surface of the temple portion as in the above embodiment, and the contact surface may be changed to an inclined shape (for example, an inclined shape in which the front side is protruded inside with respect to the rear side) or the like. In addition, the glasses according to the present invention are not limited to the ones in which the left and right temple portions provided with a pair of left and right contact portions for contact with the outer sides of the front end vicinities of the zygomatic arches of the wearer as in the above embodiment, and may be provided with two or more pairs of the left and right contact portions that perform the similar function.

Further, the contact portions are not limited to the ones fixed to the temple portion (including one detachably fixed) by screwing with a bolt/nut or the like as in the above embodiment, and may be one fixed to the temple portion (including one detachably fixed) by using elasticity (restorability after deformation) of a resin. When the contact portion is detachably fixed, it has an advantage that it can be easily replaced with another size when the size of contact portion does not match the wearer.

Figure 11:
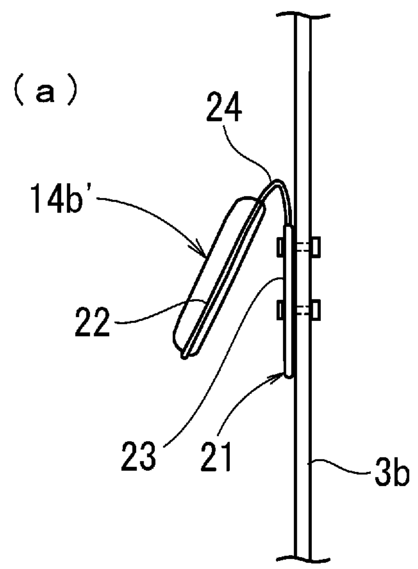
FIG. 11 is an explanatory diagram illustrating a modification of the glasses (FIG. 11A is a plan view of an installation portion of the contact portion, and FIG. 11B is a side view of the installation portion of the contact portion as viewed from inside of the temple portion).
Figure 11:
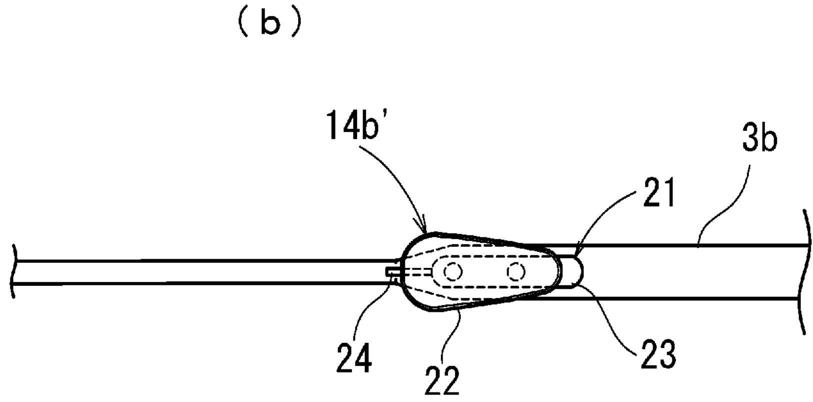

Further, the glasses according to the present invention are not limited to the ones in which the contact portions are directly fixed to the insides of the left and right temple portions as in the above embodiment, and may be one in which the contact portions are indirectly fixed to the insides of the left and right temple portions by using a metallic arm, such as a wire. FIG. 11 illustrates one example in which the contact portions are indirectly fixed to the insides of the left and right temple portions, and a contact portion 14*b*' is screwed to the inside of the temple portion 3*b* via a metallic fixing member 21. The fixing member 21 is formed by connecting an elliptical ring body 22 provided at a distal end and an elliptical plate-shaped base portion 23 with a wire-shaped arm 24 bent in a U-shape, and the base portion 23 is screwed to the inside of the temple portion 3*b*. Then, the contact portion 14*b*' formed into a flat elliptical shape by an elastic material (silicone rubber or the like) is fitted into the ring body 22 at the distal end of the fixing member 21, and the inner surface (contact surface) of the contact portion 14*b*' has an inclined shape in which the front side is protruded to the inside with respect to the rear side (a symmetry contact portion 14*a*' is similarly fixed to the left temple portion 3*a*). When the configuration is adopted, there is an advantage that the pressing strength of the contact portion 14*b*' against the temporal portion can be easily adjusted by changing the bending angle of the arm 24 of the fixing member 21.

In addition, the glasses according to the present invention are not limited to the ones in which the contact portion capable of adjusting the amount of projecting to the inside, and may be configured not to change the amount of protrusion to the inside. In addition, the contact portions are not limited to the ones in which the contact portions are fixed (engaged) to the insides of the temple portions by engaging the engaging holes provided on the rear sides with the engaging bodies provided on the inner surfaces of the temple portions, and may be fixed to the insides of the temple portions by another engaging mechanism.

Figure 12:
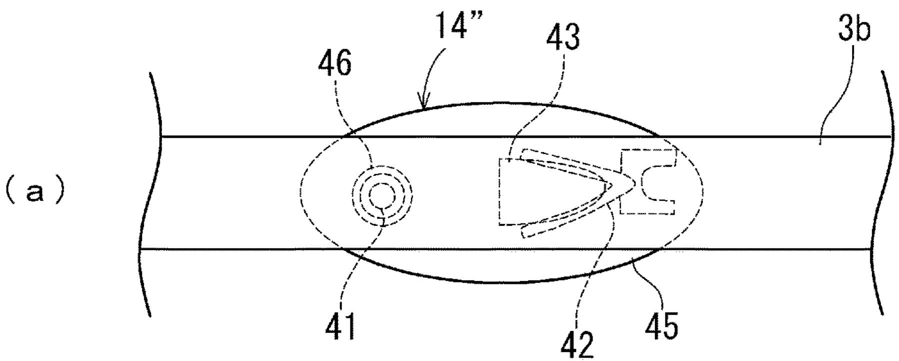
FIG. 12 is an explanatory diagram illustrating a modification of a contact portion (FIG. 12A is a side view of an installation portion of the contact portion viewed from inside (a side view viewed from the arrow C in FIG. 1), and FIG. 12B is a plan view of the installation portion of the contact portion).
Figure 12:
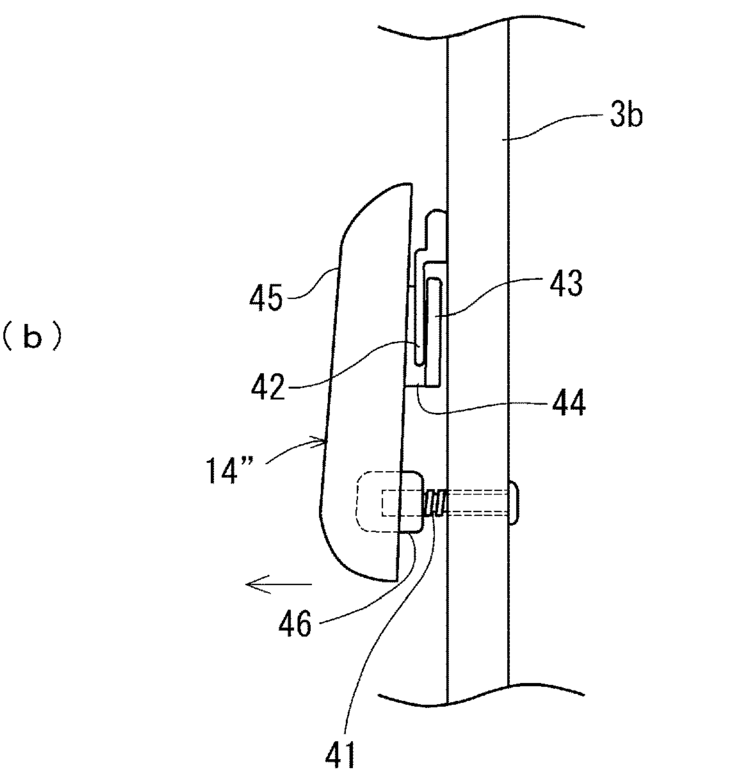

FIG. 12 illustrates an exemplary contact portion that is secured to the inside of the temple portion by an engaging mechanism that is different from the one in the embodiment. In the temple portion 3*b* (3*a*), a bolt 41 is installed so as to project inward, and a bifurcated engaging body 42 having an open rear side is fixed with a gap formed with the inner surface of the temple portion 3*b*. A contact portion 14*b*" (14*a*") is integrally formed into a flat substantially elliptical columnar shape by a silicone-based rubber or the like, and a flat plate-shaped engaging portion 43 is attached to the front side with a gap formed with the inner surface of a main body 45 with a connecting portion 44 interposed. Further, a nut 46 having a screw groove is fixed to an inner surface of the rear side of the main body 45. Similarly to the contact portion of the above embodiment, the contact portion 14*b*" (14*a*") configured as described above can be adjusted by adjusting the degree of screwing between the nut 46 and the bolt 41 to adjust the amount of projecting to the inside (the amount of protrusion in the arrow direction in FIG. 12B), and can be fixed to the inside of the temple portion 3*b* by engaging the engaging body 42 fixed to the inner surface of the temple portion 3*b* with the front end vicinity of the engaging portion 43 at a desired amount of protrusion. Even when the configuration is adopted, similarly to the glasses of the above-described embodiment, the pressing strength of the contact portion 14*b*" (14*a*") against the temporal portion can be easily adjusted (by the wearer himself).

In addition, the glasses according to the present invention are not limited to the ones in which the connecting portions between the left and right temple tips and the left and right temple portions are bent in a downward protruding shape so as to form an angle of 150° as in the above embodiment, and the bending angle at the connecting portions between the left and right temple tips and the left and right temple portions can be appropriately changed as needed. When the bending angle is adjusted to a range of approximately 100° to 165°, the respective temple portions can be arranged along the upper edges of the zygomatic arches of the wearer in a length allowing a sufficient pressing force (so as not to be displaced), and it is preferred to adjust the bending angle to a range of 120° to 155°.

Figure 13:
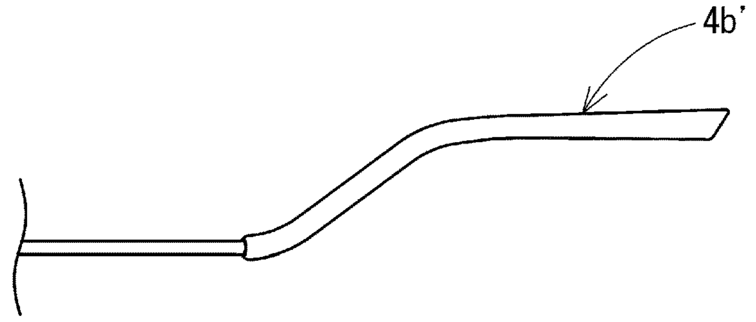
FIG. 13 is an explanatory view illustrating a modification of the glasses (right side view of a temple tip).

Further, it is only necessary that the left and right temple tips are arc-shaped (arc-shaped protruding upward in side view), and it is not limited to the one bent upwardly protruding in a substantially semicircular arc shape (substantially inverted U-shaped) as in the above embodiment. As illustrated in FIG. 13, it may be changed to one with the upwardly protruding about ¼ of the arc shape (chevron-shaped) to reduce the inclination angle with respect to the horizontal line at the tip vicinity (inclination angle is about 0° to) 20°, or the like.

The glasses according to the present invention are not limited to the ones in which the pressing protrusions disposed at the proximal end sides of the left and right temple tips for pressing the upper portions of the rear end vicinities of the zygomatic arches of the wearer as in the above-described embodiment, and may be without the pressing protrusion. Further, as in the above embodiment, when the pressing protrusions are formed on the proximal end sides of the left and right temple tips, the pressing protrusions are not limited to be integrally formed on the left and right temple tips as in the above embodiment, and may be formed separately from the left and right temple tips and attached to the proximal end sides of the left and right temple tips. In addition, the pressing protrusion is not limited to the one having a shape bulging so as to be wider to the left and right than the other portion (to a large diameter) (that is, a substantially semi-cylindrical shape) as in the above embodiment, and may have a conical shape (a portion having a rounded front end chamfered) or a truncated conical shape, or the like. Furthermore, the height of the pressing protrusion (that is, the amount of protrusion to the inside) is not particularly limited, but it is preferred that the height is adjusted to be within a range from 3.0 mm to 6.0 mm because the degree of pressing of the temple portions of the wearer becomes good and the restraining forces of the left and right temple tips to the ear portions of the wearer are extremely high.

INDUSTRIAL APPLICABILITY

As described above, the glasses according to the present invention can be suitably used for the purpose of correcting visual acuity, the purpose of blocking sunlight, and a fashion item.

DESCRIPTION OF REFERENCE SIGNS

G . . . Glasses
1 . . . Frame
2 . . . Lens holder
3*a*, 3*b* . . . Temple portion
4*a*, 4*b*, 4*b*' . . . Temple tip
13 . . . Pressing protrusion
14*a*, 14*b*, 14*b*', 14*b*" . . . Contact portion
P . . . Downward-protruding bending portion

The invention claimed is:

1. Glasses comprising:

a lens holder for holding a pair of left and right lenses;

temple portions extending rearwardly from respective left and right ends of the lens holder; and temple tips provided on respective tip vicinities of the temple portions, wherein each of the temple tips is bent in an upward protruding shape so as to contact a portion from a rear side to a front side of a base of a helix of the wearer, each of the temple tips is connected to a respective one of the temple portions via a connecting portion bent in a downward protruding shape so as to arrange each of the temple portions along an upper edge of a zygomatic arch of the wearer, each of the temple tips has a proximal end side provided with a pressing protrusion for pressing an upper portion of a rear end vicinity of a zygomatic arch of the wearer, the pressing protrusions are formed on a portion inclined in the downward direction at the proximal end vicinity in each of the left and right temple tips, the pressing protrusions are formed so as to bulge inward by a predetermined length relative to respective cores at the distal ends of the temple portions, more than the other portions, and a contact portion formed on an inside of each of the temple portions to be brought into contact with an outer side of a front end vicinity of the zygomatic arch of the wearer, and the contact portions are configured to be adjustable in an amount of inward projection.

2. The glasses according to claim 1, wherein the pressing protrusion is a substantially semi-cylindrical body protruding inward along a longitudinal direction of each of the temple tips.

3. The glasses according to claim 1, wherein the contact portions are fixed to the inside of the temple portions with using a bolt and a nut, and the contact portions are configured to be adjustable in the amount of inward projection by adjusting a screwing degree between the bolt and the nut.

* * * * *